(12) United States Patent
Ibrahim et al.

(10) Patent No.: US 9,565,610 B2
(45) Date of Patent: Feb. 7, 2017

(54) PICO CELL WIRELESS LOCAL AREA NETWORK (WLAN)

(75) Inventors: Tarek Ibrahim, Hoboken, NJ (US);
John Brancato, Tappan, NY (US);
John Bongiorno, Litchfield, CT (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 13/405,181

(22) Filed: Feb. 24, 2012

(65) Prior Publication Data

US 2012/0300746 A1 Nov. 29, 2012

Related U.S. Application Data

(63) Continuation of application No. 10/587,879, filed as application No. PCT/US2005/045440 on Dec. 16, 2005, now abandoned.

(60) Provisional application No. 60/636,741, filed on Dec. 16, 2004.

(51) Int. Cl.
  *H04W 4/00*    (2009.01)
  *H04W 36/30*   (2009.01)
  *H04W 84/12*   (2009.01)

(52) U.S. Cl.
  CPC ............. *H04W 36/30* (2013.01); *H04W 84/12* (2013.01)

(58) Field of Classification Search
  USPC ............................................. 455/436; 707/10
  See application file for complete search history.

(56) References Cited

U.S. PATENT DOCUMENTS

| | | |
|---|---|---|
| 7,164,915 B2 | 1/2007 | Zaki |
| 7,236,786 B2 | 6/2007 | Shen et al. |
| 7,289,472 B2 | 10/2007 | Yano et al. |
| 7,400,604 B2 | 7/2008 | Lee et al. |
| 2004/0114546 A1 | 6/2004 | Seshadri et al. |
| 2004/0246922 A1 | 12/2004 | Ruan et al. |
| 2005/0060319 A1* | 3/2005 | Douglas et al. ............. 707/10 |

(Continued)

FOREIGN PATENT DOCUMENTS

| | | |
|---|---|---|
| DE | 10245118 A1 | 4/2004 |
| EP | 1026910 A1 | 8/2000 |
| EP | 1075160 A1 | 2/2001 |

OTHER PUBLICATIONS

Davi, Gregory, "Using Picocells to Build High-Throughput 802.11 Networks", Jul. 1, 2004, RF Design Magazine, pp. 16-19.

(Continued)

*Primary Examiner* — Shahriar Behnamian
(74) *Attorney, Agent, or Firm* — Meyertons, Hood, Kivlin, Kowert & Goetzel, P.C.

(57) ABSTRACT

A pico cell wireless LAN and pre-emptive roaming algorithm is provided to allow mobile devices in the WLAN to hand-off to another different access point quickly and efficiently. Once associated with an access point (AP), the mobile device receives information about neighboring APs that may be available for hand-off during roaming (or insufficient signal strength). Signal strength of the associated AP is continuously monitored and if signal strength from the associated AP falls below a threshold, the mobile device measures signal strength of the neighboring APs in the list, ranks them, and selects an AP for hand-off. AP load and other information may be used to rank the neighboring APs. The mobile device hands-off to (or associates with) one of the neighboring APs, if appropriate. Hand-offs are attempted in order or rank.

20 Claims, 3 Drawing Sheets

(56) References Cited

U.S. PATENT DOCUMENTS

| | | |
|---|---|---|
| 2005/0088993 A1* | 4/2005 | Jung et al. .................... 370/331 |
| 2005/0138178 A1 | 6/2005 | Astarabadi |
| 2005/0282546 A1 | 12/2005 | Chang et al. |
| 2006/0040666 A1 | 2/2006 | Narasimha et al. |
| 2006/0187873 A1 | 8/2006 | Friday et al. |

OTHER PUBLICATIONS

Kwak, Joe, InterDigital, "WLAN Handoff Scenarios, Example handoffs with RRM measurements and network assistance," IEEE 802-11, Mar. 13, 2003, 13 pages.

International Search Report in Application No. PCT/US2005/045440, Jun. 4, 2006, 4 pages.

\* cited by examiner

PICO CELL WIRELESS LOCAL AREA NETWORK (WLAN)

CROSS-REFERENCE TO RELATED APPLICATIONS

The present application is a continuation of prior U.S. patent application Ser. No. 10/587,879 filed on Jul. 27, 2006 now abandoned which claims priority under 35 U.S.C. §371 to International Patent Application No. PCT/US2005/045440 filed Dec. 16, 2005, entitled "PICO CELL WIRELESS LOCAL AREA NETWORK (WLAN)." International Patent Application No. PCT/US2005/045440 claims priority to U.S. Provisional Patent Application No. 60/636,741 filed Dec. 16, 2004, and which are incorporated herein by reference into the present disclosure as if fully set forth herein.

TECHNICAL FIELD

The present invention relates generally to communication networks, and more particularly to a wireless local area network having small cell coverage areas.

BACKGROUND

Current wireless systems or networks are configured with cells having relatively large coverage areas. In an application in which there are high number of users who may roam often within a small coverage area, current wireless techniques may not be applicable due to co-channel interference issues and faster than normal requirements for a hand-off.

Accordingly, there is needed a WLAN architecture in small area/high density/fast roaming applications having pico small cells and method for preemptively recognizing potential hand-off scenarios in a mobile device and applying a fast hand-off routine or process for fast hand-offs.

SUMMARY

In accordance with one embodiment of the present invention, there is provided a method of hand-off for a mobile terminal from a first access point to a second access point in a wireless local area network (WLAN). The method measures in a mobile terminal signal to noise ratio (SNR) of first RF signals received from the first access point. If the measured SNR of the first RF signals exceeds a first threshold, SNR of RF signals received from a plurality of candidate access points in a roaming candidate list stored on the mobile terminal is measured. From the measured SNRs of the candidate access points it is determined whether any of the measured SNR exceed a second threshold, and if so, those candidate access points are identified in a new association list. One of the candidate access points in the new association list is selected and an attempt to associate the mobile terminal to the selected candidate access point is made.

In another embodiment, there are provided means for performing the above method steps or functions.

In yet another embodiment, there is provided a state machine for use by a mobile terminal in a wireless area network. The state machine includes a first state in which the mobile terminal is associated with a first access point in the network and signal to noise ratio (SNR) of first RF signals received from the first access point are measured; a second state in which SNR of RF signals received from a plurality of candidate access points in a roaming candidate list are measured and it is determined from measured SNRs of the candidate access points whether any of the measured SNRs exceeds a second threshold, and if so, identifying those candidate access points in a new association list, the state machine transitioning from the first state to the second if the measured SNR of the first RF signals exceeds a first threshold; and a third state in which one of the candidate access points in the new association list is selected and an attempt is made to associate the mobile terminal to the selected candidate access point, the state machine transitioning from the second state to the third state if there is at least one candidate access point in the new association list.

In yet another embodiment, a mobile terminal for communicating with one or more access points in a wireless local area network (WLAN) is provided, the mobile terminal includes a processor, a transceiver coupled to the processor, and an antenna coupled to the transceiver for receiving and transmitting RF signals from and to the one or more access points in the WLAN. The processor is operable for: measuring signal to noise ratio (SNR) of first RF signals received from the first access point; if the measured SNR of the first RF signals exceeds a first threshold, measuring SNR of RF signals received from each of a plurality of candidate access points in a roaming candidate list stored in the mobile terminal; determining from measured SNRs of the candidate access points whether any of the measured SNR exceed a second threshold, and if so, identifying those candidate access points in a new association list; selecting one of the candidate access points in the new association list; and attempting to associate the mobile device to the selected candidate access point.

In still another embodiment, there is provided a wireless local area network (WLAN). The WLAN includes a plurality of sets of access points operable for communicating wirelessly with one or more remote client devices, each set of access points defines a cell having a predefined communication coverage area within the WLAN. The WLAN also includes a plurality of switches communicatively coupled to access points. The communication coverage area of each defined cell is less than about 1000 hundred square feet and the access points in a first cell are operable for transmitting a roaming candidate list to a mobile device associated with one of the access points in the first cell, the list identifying one or more neighborhood access points.

Furthermore, a computer program performing one or more of these methods is embodied on a computer readable medium and operable for executing one or more of the methods and functions described herein.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
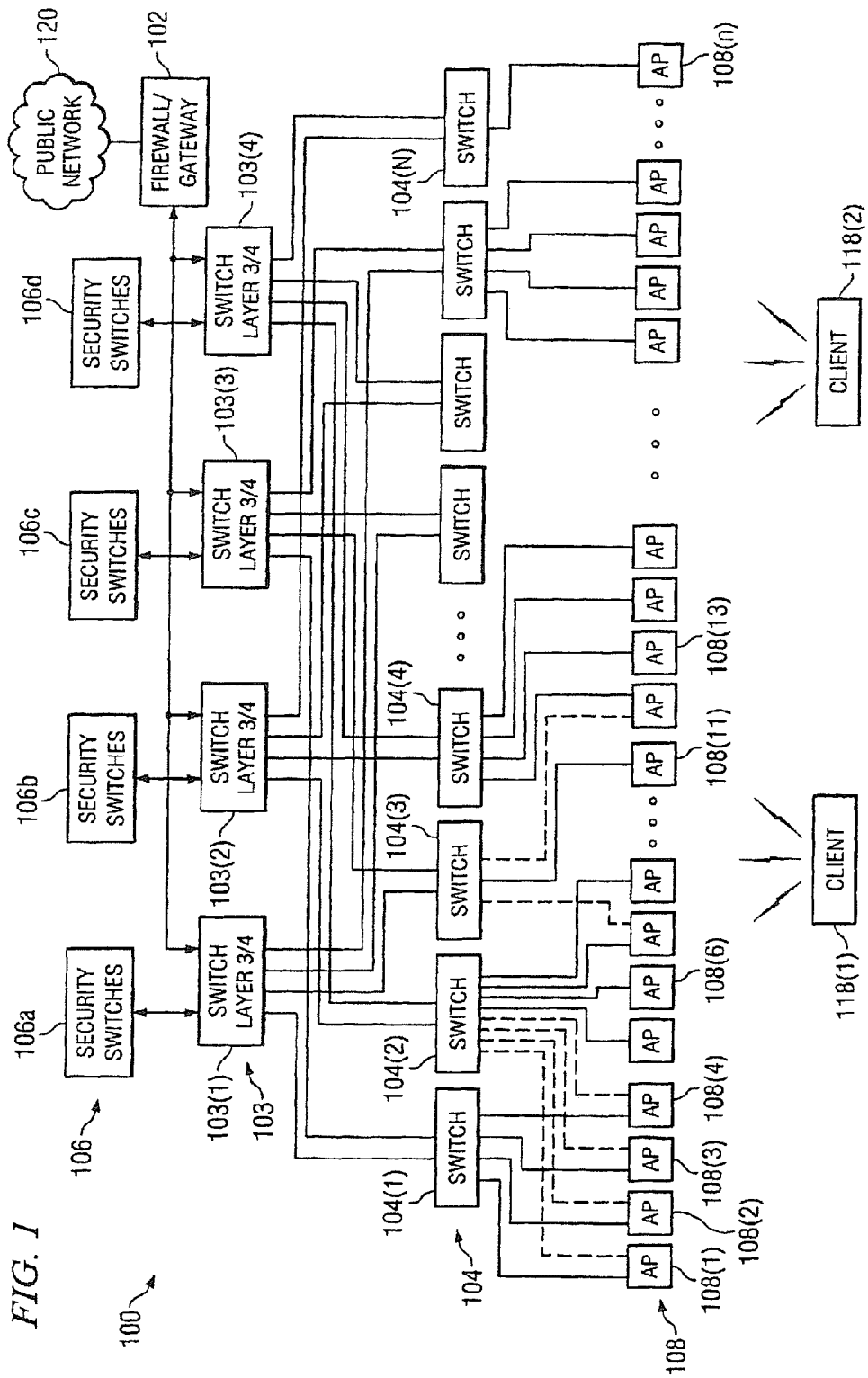
FIG. 1 illustrates an example pico cell wireless local area network or system in accordance with the present invention.

FIG. 1 illustrates an example wireless local area network (WLAN) or system 100 in accordance with the present invention. The WLAN or system 100 shown in FIG. 1 is for illustration purposes only. Other embodiments of the WLAN 100 may be used without departing from the scope of this disclosure.

In this example, the WLAN 100 includes a firewall/gateway 102 for coupling to a public network 120. The WLAN 100 further includes one or more routers/switches (or L3/L4 switches) 103, one or more switches 104 (e.g., L2 switch), one or more security switches 106, a plurality of wireless access points (APs) 108 each having an antenna (not shown). The gateway 102 functions to communicatively couple the WLAN 100 to the public network 120, and may further include firewall and security functionality. It may also include router switch functionality, such as L2/L3 switching. The WLAN 100 further includes one or more mobile devices 118 communicatively coupled wirelessly to the WLAN 100 via the APs 108.

The public network 120 may include one or more local area networks ("LAN"), metropolitan area networks ("MAN"), wide area networks ("WAN"), all or portions of a global network such as the Internet, or any other communication system or systems at one or more locations, or combination of these. Further, the network 120 may include various servers, routers, bridges, and other access and backbone devices (not shown). In one embodiment, the network 120 is a packet data network that utilizes any suitable protocol or protocols, and in a specific embodiment, the network 120 (and most components of the system 100) operates in accordance with the Internet Protocol (IP). As will be appreciated, the concepts and teachings of the present invention are not limited to IP, but may be utilized in any data packet network that facilitates communication between components coupled to the public network 120, including Internet Protocol ("IP") packets, frame relay frames, Asynchronous Transfer Mode ("ATM") cells, or other data packet protocols.

The specific hardware configuration of the firewall/gateway 102, switches 103, switches 104, security switches and the access points 108 is not essential to the present invention, and these elements may be implemented using such components or devices as the Nortel (Ethernet Routing Switch) ESR 8600 L2/L3 Routing Switch (firewall/gateway 102, switches 103), Nortel (Ethernet Switch) ES 460 Switch (switches 104), WLAN 22XX/23XX Security Switches (switches 106) and Nortel WLAN 22XX/23XX Access Points (access points 108), available from Nortel Networks, Ltd.

In general terms, the WLAN 100 provides wireless connectivity and communications capabilities to the mobile devices 118 when the devices are within a finite coverage area of the WLAN 100. The coverage area of the WLAN is determined by the respective positions of the access points 108 and/or the APs antennas and the operating parameters of the WLAN 100.

In the WLAN 100 of the present invention, the overall coverage area is divided into a number of pico cells (this may be done conceptually or functionally, or a combination thereof). The term "pico" is used herein to refer to the size of the cells within the overall coverage area. Pico cells usually are configured to have operating coverage areas much smaller than other conventional wireless communications systems, such as cell phone or WiFi systems. In the present invention, the coverage areas of pico cells are in the range of about 1000 square feet or less. In other embodiments, the coverage areas may be 500 square feet or less, and may range down to even about 100 square feet in area. In yet other embodiments, coverage areas are about 200 square feet or less, or may be in the range of about 150 to 200 square feet. The cell coverage area sizes, as well as cell configurations, may be the same or different for different cells.

Each access point 108 has associated therewith at least one antenna (not shown) operable for transmitting and receiving wireless signals, thus providing wireless connectivity to the WLAN 100 for the mobile devices 118. An access point 108 and associated antenna may be described functionally or logically as an access point (or as in conventional systems, a base station). In essence, single or multiple access points or "base stations" may exist for a cell, and multiple access points or base stations may be utilized for redundancy purposes or for increasing the number of mobile devices that can be serviced/connected within a given cell. Many different cell configurations (shape and size of coverage areas, bandwidth, number of connections, etc.) utilizing different combinations and numbers of access points 108 are possible, as determined or chosen to meet specifications and operating parameters of the network to be implemented. Coverage areas of cells may also overlap.

A given pico cell may have one or more access points (configured using any combination of access point devices 108) associated with the cell. For example (not shown), a particular cell may have a specific cell coverage area using AP 108(1), AP 108(6), AP 108(11) and AP 108(13) (coupled to switches 104(1) through 104(4), respectively) placed at one or more appropriate predefined locations. In one embodiment, each AP 108 is assigned to a single channel within the channel band of the wireless protocol. Channel assignment to APs 108 is based on the desired network configuration and coverage.

Antennas for the APs 108 may be omni-directional or directional. In one embodiment, the antennas are directional and the number and placement of the antennas, as well as the intended coverage area, may be configured or chosen to meet the desired network requirements. The antennas may be integrated with the access point device 108, as in the case of a Nortel WLAN 22XX/23XX Access Point device, or may be coupled via a wire link.

Again referring to FIG. 1, the WLAN 100 includes both wireless and wireline communication links. The wireless communication links (or wireless interface) are those links between the mobile devices 118 and the antennas of access points 108. The wireline communication links (or wireline interface) are those links that connect the APs 108 to the switches 104, the switches 104 to the switches 103, the switches 103 to the security switches 104 and to the firewall/gateway 102. In other embodiments, one or more of the wireline communication links may be wireless.

It will be understood that the wireless components or portion of the WLAN 100 may operate utilizing any suitable wireless protocol(s) and other communication protocol(s). In one specific embodiment, the wireless interface and components, namely, the access points 108 and mobile devices 118 operate in accordance with IEEE 802.11.

As illustrated in FIG. 1, each access point 108 has a dedicated communications link for carrying forward and reverse traffic between the AP 108 (and the one or more associated mobile devices 118) and an associated switch 104. Each switch 104 may have any number of APs 108 connected thereto, and in the embodiment shown in FIG. 1, four APs 108(1) through 108(4) are connected to the switch 104a. The dedicated links between switches 104 and connected APS 108 may use any suitable protocol, such as Ethernet, and may carry one or more communications channels. For example, each link may have 100 Mbps capability.

Optionally, each AP 108 has a second dedicated line (shown in dotted lines) that is connected to a different switch 104. This provides redundancy or increased operability in the network such that if one switch 104 fails, the APs originally associated with that switch 104 may still operate through one or more other switches 104. The illustrated configuration provides some resiliency and routing redundancy in the network. Other configurations may be utilize.

Each switch 104 has two dedicated communications link for carrying forward and reverse traffic between the switch 104 (and the one or more associated APs 108) and two associated switches 103 (e.g., switches 103(1) and 103(3) as a pair, or switches 103(2) and 103(4) as a pair. Each switch 103 may have any number of switches 104 connected thereto, and in the embodiment shown in FIG. 1, half of the switches 104 are connected to a pair of switches 103(1) and 103(3), while the other half are connected to a pair of switches 103(2) and 103(4). This is done for backup and loading purposes.

In one embodiment for example, the switches 103(1) and 103(3) each handle or are assigned 50% of the load from their connected switches 104 (primary for some and secondary for other switches 104). In the event that one switch in the pair fails, the other switch in the pair may take over. Switch pairs 103(2) and 103(4) are configured and operated similarly. Optionally, each switch 103 in a switch pair may be located at a different location or "room" to provide additional resiliency. The dedicated links between switches 104 and connected APS 108k may use any suitable protocol, such as Ethernet, and may carry one or more communications channels. For example, each link may have 1 Gbps capability over fiber.

As illustrated in FIG. 1, the switches 103 are connected to one or more security switches 106 and the firewall/gateway 102 (and the one or more associated mobile devices 118). Each switch 103 may have any number of security switches 106 connected thereto, and in the embodiment shown in FIG. 1, each switch 103(1) through 103(4) is connected to a number of associated security switches 106a through 106d (for example eight switches per block). Dedicated or shared links may be used, and any suitable protocol, such as Ethernet, may be used.

Connections between switches 103 and the gateway/firewall 102 may be similarly implemented.

The security switches 106 typically provide control and advanced functions of the wireless control and forwarding planes of the network 100, while the switches 103 and 104 provide control and advanced function of the wired control and forwarding planes.

In one or more another embodiments, each of the communications links/lines/channels between access points 108 and switches 104, between switches 104 and switches 103, and between switches 103 and security switches and firewall gateway 102, may be carried on a shared data network (not shown), having high data rates such as 10G Ethernet (and may comprise one or more physical channels, and perhaps many logical channels, etc.).

As will be appreciated, FIG. 1 illustrates one example of an implementation of a WLAN 100 in accordance with the present invention. Other implementations and network configurations may be utilized.

The mobile devices 118 represent any devices that may be communicatively coupled wirelessly to a data network, including but not limited to computers, modems, PDAs, routers, switches, or any other network devices and the like. Each of the mobile devices 118 may be constructed or configured from any suitable hardware, software, firmware, or combination thereof for transmitting or receiving information in the WLAN 100.

Figure 2:
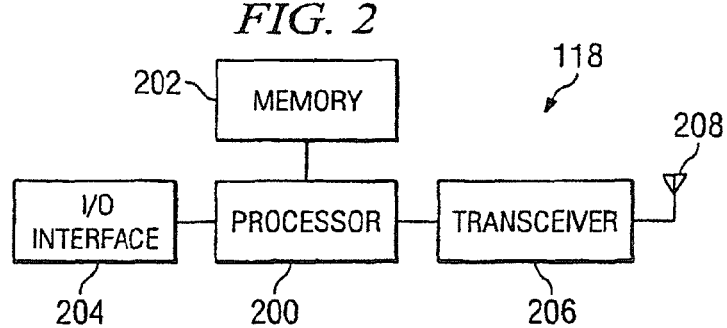
FIG. 2 depicts a block diagram of a mobile device shown in FIG. 1.

Now referring to FIG. 2, there is illustrated a block diagram of one embodiment of a mobile device 118 in accordance with the present invention. The mobile device 118 includes a processor or controller 200, a memory 202, an input/output interface 204, a transceiver 206 and an antenna 208. The conventional functionality of these components for providing wireless communication is omitted as this is within the knowledge of a person of skill in the art. In one embodiment, the mobile device 118 includes the components integrated therein as part of the mobile device 118. In another embodiment, these components and functionality are implemented as a WLAN mobile adapter Card Bus PC card which may be installed on various computing devices to achieve wireless connectivity. One example of a WLAN mobile adapter are those available from Nortel Networks, Ltd and identified as WLAN 2201/2202 Mobile Adapter. Though the term "mobile" may be used herein to refer to the devices 118, these devices may also be stationary or fixed within the WLAN 100, and may also be referred to as "client devices" as well as "terminals."

Figure 3:
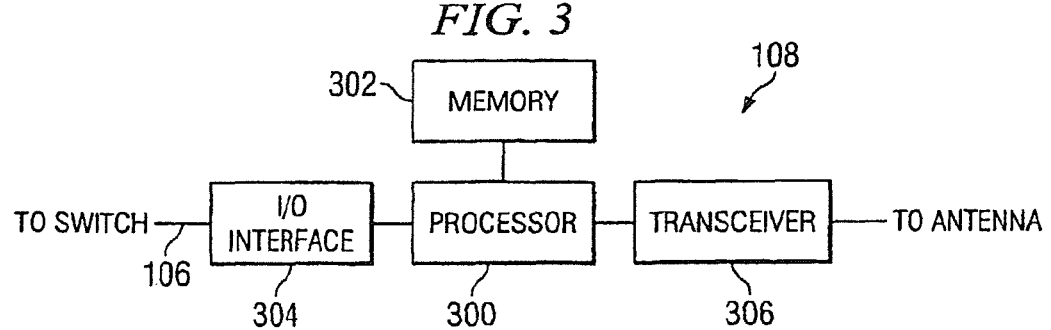
FIG. 3 depicts a block diagram of an access point shown in FIG. 1.

Now referring to FIG. 3, there is illustrated a block diagram of one embodiment of an access point 108 in accordance with the present invention. The access point 108 includes a processor or controller 300, a memory 302, an input/output interface 304 and a transceiver 306. The transceiver 306 receives/transmits signals from/to an antenna (not shown) positioned at or near the access point 108. The antenna may alternatively be integrated with the access point 108. The conventional functionality of these components for providing wireless communication is omitted as this is within the knowledge of a person of skill in the art. Each of the access points 108 may be constructed or configured from any suitable hardware, software, firmware, or combination thereof for transmitting or receiving wireless data in the WLAN 100.

Though the pico cell WLAN 100 of the present invention has some functional and overall wireless communication similarities to conventional wireless communications networks, different functional and application needs of a pico cell-type WLAN require new processes and functionality. The pico cell network configuration of the present invention is useful when design considerations include a high number of users and high user density within a relatively small area, high bandwidth per user, high resiliency under single and multiple points of failure, and the applications are sensitive to lost data packets.

Due to unique issues raised in such environments by having small cell sizes, the complexities of roaming (and roaming often) and sensitivity to connection drops, the application of conventional wireless network techniques is not practical in a pico cell WLAN environment. It has been determined that new techniques for handling or addressing co-channel interference and fast roaming are beneficial in implementing a pico cell WLAN in accordance with the present invention.

Co-channel interference is a significant problem when cell sizes are relatively small and access points 108 (or antennas) are close to each other. The goal is to contain the RF signal such that its effects are reduced outside the desired cell coverage area. Also, since cell coverage areas are designed to be relatively small, it is beneficial to effectively limit the range of a channel into adjacent cells. The pico cell WLAN 100 of the present invention implements transmission power levels that are lower than traditional wireless systems in conjunction with directional antennas. Further, the WLAN 100 operates with and utilizes upper and lower receive level thresholds at both the mobile devices 118 and access points 108. Levels of received RF signals are measured (e.g., power, SNR, etc.), and when the levels are below a lower threshold, the RF signals (or packets) are ignored (weak packets ignored). Optionally, an upper threshold may also be used. This reduces co-channel interference (i.e., interference on the same channel but generated by an AP or client device using the channel in another cell).

The present invention further provides a fast roaming algorithm or process for use within a wireless network, such as the WLAN 100. In one embodiment, the method is performed by the mobile device 118 (also referred to as the client) as part of its mobile device driver program or processing. Now referring to FIG. 4, there is shown a diagram of a state machine implementing a fast roaming mode or process 400 executed by the mobile device 118 within the WLAN 100 for establishing and maintaining a connection with an access point. 108. The process 400 further implements a fast roaming algorithm in accordance with the present invention. In one embodiment, most or all of the process 400 is initiated and executed when the fast roaming mode (implemented as part of a pico cell network) is desired or appropriate. Typically, the mobile devices 118 will be able to operate in one of two modes—standard mode (standard roaming in a conventional wireless network) and fast roaming mode (for roaming in a pico cell type network).

In general terms, the mobile device 118 enters the fast roaming mode 400 when it detects an access point 108 advertising a pico cell information element ID in its beacons. In the fast roaming pico cell mode 400, the mobile device 118 receives a roaming candidate list in the association response packet (or some other transmission) when it associates or establishes a connection to a given access point 108 and stores this list. The client 118 uses this list of roaming candidates to find another access point when a preemptive handoff threshold is reached. During a preemptive handoff decision phase, the client alternates between scanning candidates on the roaming list with directed probes and moving traffic to minimize packet latency. In the event that the preemptive handoff fails or the client loses connectivity with the network, an active scan of all the available channels is conducted to find an access point.

The fast roaming process 400 may be enabled by the user via a client utility or it will automatically be enabled when the mobile device 118 has located an access point 108 which advertises pico cell capability in its beacons or other responses (e.g., probe responses, etc.). Otherwise, some conventional or standard wireless roaming algorithm(s) will likely be implemented by the mobile device 118 (standard mode). The fast roaming algorithm minimizes broadcast probe request traffic and, in one embodiment, limits the time that a client 118 is off channel to less than 100 msec out of any 150 msec period of time while the client is associated and has network connectivity. It also works to limit the number of clients 118 connected to a single AP 108 to meet any desirable load balancing requirements. The two-mode operation may be ignored, and the mobile devices 118 may always operate in accordance with the fast roaming mode in any wireless network, if desired.

The present invention provides a method that is preemptive in nature to allow roaming to another access point before losing connectivity to the currently associated access point. While in the associated state, the client 118 monitors the SNR of the associated access point at regular intervals. In one embodiment, if the client loses network connectivity, it will scan the list of roaming candidates with directed probe requests before transitioning to the state of total loss of network connectivity. When a mobile device 118 has no connection to an access point 108, it will perform an active scan using broadcast probe requests to find an access point 108. In one embodiment, a complete active scan will take (100 msec dwell time plus 5 msec switching overhead) per channel, and if there are twenty channels, for example, it may take about two seconds.

Again referring to FIG. 4, below is a more detailed description of the process 400.

Figure 4:
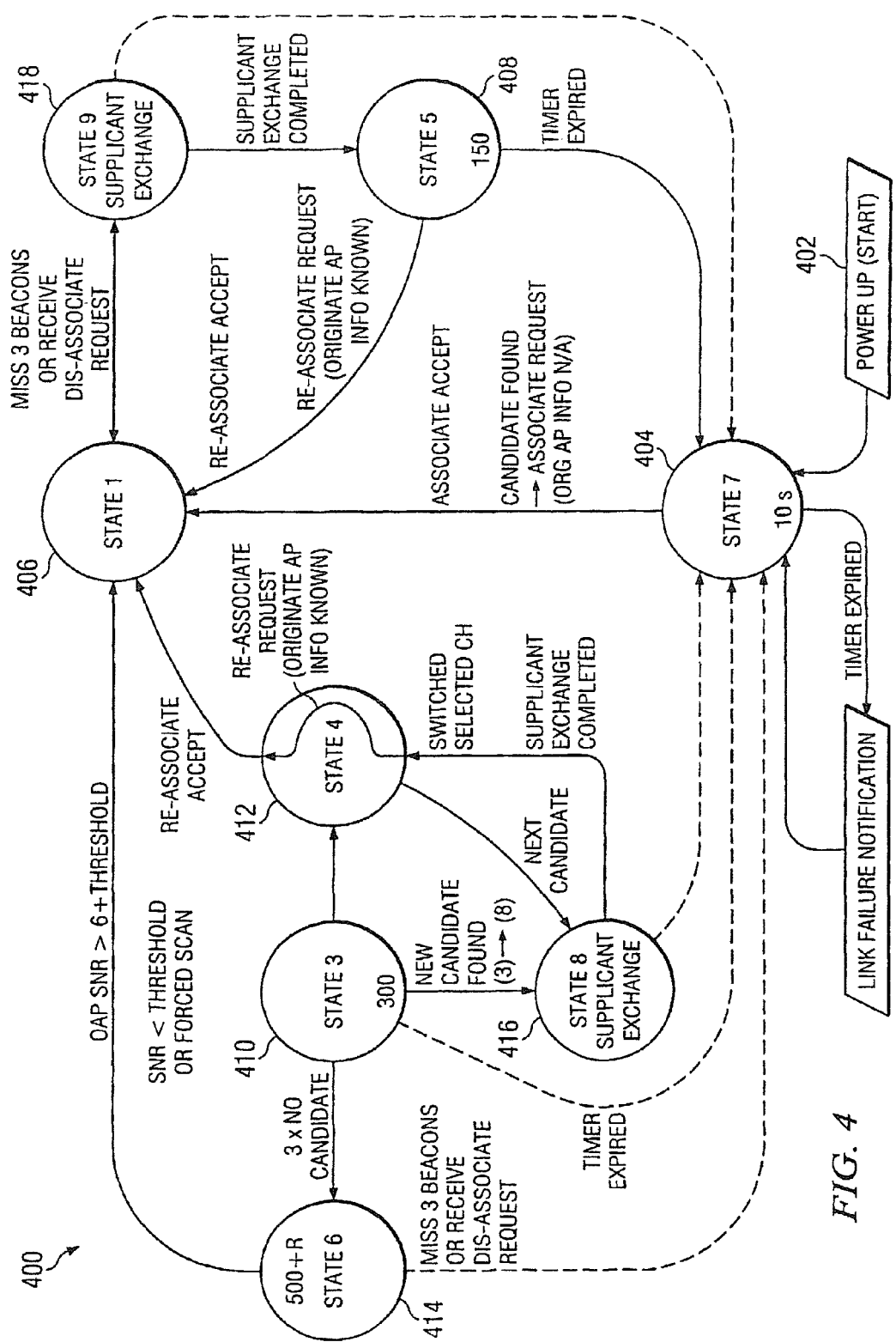
FIG. 4 is a state diagram illustrating a fast roaming algorithm or process in accordance with the present invention.

A Start state 402 is the power up or booting state of the process 400. After start-up or initialization, the mobile device 118 enters a Connection Lost State 404 (State 7). This state is functionally an active scan or pico cell network detection process or state. State 404 is entered during initial power up, when reassociation fails (from State 5), or when an association is lost in some other manner (beacons lost/association lost, dissociation, reset, other error) (from States 3, 6, 8 or 9), as shown in FIG. 4.

In this state 404, the mobile device 118 actively scans all available channels looking for an access point 108 by broadcasting request probes and receiving replies from the available channels and may also determine that it is operating in a pico cell network (from beacon or response probe information). From the received information, a given channel is selected and a connection is established (also referred to as an association) to an access point 108. The process then enters the Current AP Monitor State 406 (State 1). Various steps may be performed to establish the connection/association, including authentication, handshaking, encryption/security, etc. In one embodiment, the channel having the highest signal-to-noise ratio (SNR) is selected, however other selection criteria or information may be used, such as load factors, network environment and operating parameters, etc.

If the client 118 does not find an access point 108 within a specified period of time (i.e. default=10 seconds) a disconnect timer will be used internally to notify the operating system (OS) of the loss in media connection (link failure notification). Any data queued from the OS network stack when in this state will only be queued until the client TX data queues become full, at which point any new data received may be dropped.

State 1 is the desirable stable state of being associated with an access point 108 with a high SNR and further involves continuous monitoring of SNRs. The goal of the fast roaming process 400 is to be in State 1 and, when not in State 1, to return to State 1 as quickly as possible and, in one embodiment, within about 300 msec or less. This may be accomplished by using preemptive handoffs and processing and avoiding performance of a full active scan process (i.e., State 7) to complete a handoff.

In State 1, SNR is measured from beacons and/or overheard packets from the associated access point 108. The measured SNR samples are used to make state transition decisions and AP selection decisions. There should be at a minimum at least one new measured SNR sample every 100 msec (typical beacon interval).

In one embodiment, a filtering mechanism is employed for detecting the changes in SNR values of the samples over time (e.g., reducing or eliminating state transitioning when only a single beacon or sample is missed). These SNR samples are fed into a recursive filter and the output of the filter used to make state transition decisions and AP selection decisions. To make mobility decisions at a rate of a handoff about every 5 seconds, the SNR information needs to be sufficient to get a filter output every 100 msecs. Given a beacon interval of 100 msec there should be at least 1 SNR sample available every 100 msecs. The filter coefficients need to be selected to allow the filter output to settle within 1 second or 10 samples. For example, given a filter time constant of three samples, a sudden change in SNR will be detected in approximately 300 msecs. Other methods may be utilized.

In State 1, the mobile device 118 receives from the associated AP 108 information about other APs 108. This information may include a list of neighborhood APs (or potential roaming candidate APs) and other network, system or device-specific information.

While in State 1, the process transitions to another state when one of three events occurs, as shown. In a first event, when there is a loss of network connectivity (association lost or disassociation), the process transitions to a Reassociation State 408 (State 5). Optionally, if another type of error occurs, then the process may transition directly to the Lost Connection State 404 (State 7). In a second event, if an associated client 118 misses "m" (or other desired number) beacons or receives a disassociation request when in State 1, the client 118 transitions to the Reassociation State 408 (State 5) where it attempts to reassociate to the current AP. If it cannot reassociate (e.g., timer expires), the client 118 transitions to the active broadcast scan state (Connection Lost State 7) and processing occurs in accordance with that state. Alternatively (not shown), the client 118 may attempt to find another access point by using the candidate roaming list before going to State 7.

In a third event, when the measured SNR drops below a preemptive handoff threshold (the SNR requirement of the minimum supported data rate plus a configurable margin, e.g., 19 dB plus 6 dB), the mobile device 118 transitions to a Candidate Search State 410 (State 3) which initiates a preemptive roaming process to find and select a new AP 108 for association. In one embodiment, the SNR threshold or margin may be configurable or computed by the network 100 (or its administrator) and may be generated or determined by the associated AP 108 or switches 106 and transmitted to the client device 118. Additionally, the threshold may be applicable network wide or may be localized and different for different switches and/or APs and/or protocols, etc.

State 3, generally, performs a scanning/searching and selection process. If an access point is found with an SNR above the measured SNR of the current AP plus a specified margin, the client will attempt to associate with this new access point. This margin may be the margin referred to in calculating the preemptive handoff threshold (floor SNR for connectivity plus margin) or may be a different one. Optionally, the margin value is configurable. If the client cannot find a new access point or fails to associate with the new access point, the client will maintain the current association and keep looking for a new access point.

State 3 is the first step towards a preemptive handoff. In this state, the client 118 sends directed probes to access points 108 in the roaming candidate list to gather the SNR and load information from these access points in preparation for choosing a new access point in a Fast Handoff State 412 (State 4). The roaming candidate AP list is generated by the associated AP 108 and/or its associated switch 106 and transmitted to the client device 118 when entering into or transitioning to State 1 (or at the beginning or early phase of State 1).

State 3 includes alternating scan and traffic windows. During the scan window, directed probe requests are sent to each AP 108 in the roaming candidate list for the duration of an AP dwell time. The length of the scan window determines the maximum amount of time the associated AP 108 will be off channel and thus the maximum packet delay for user traffic. During the traffic window, the client 118 goes back to the channel of its associated access point 108 (the current AP) to move data both up and down (transmit/receive). In one embodiment, the default scan and traffic windows are 50 and 25 msec, respectively. In another embodiment, these times may be 300 msec, alternating between scan windows and traffic windows. The maximum amount of time in this state is a function of the environment and how fast the SNR changes.

To ensure reliable measurements or estimates of the SNR for the current associated AP, the current AP will also be sent directed probe requests at the end of scanning the roaming list. The current AP is the last AP probed in order to obtain the most up to date information of the current SNR value, though other timing schemes may be utilized. During State 3, an average SNR of the current AP is used as the point of reference during the selection process rather than the SNR filter output (described previously with respect to SNR monitoring in State 1). In the event the current AP does not respond to any probe requests, the client 118 will assume that the current AP is out of range and will use an SNR floor, which may be optionally configured to different values, as the comparison value. If the current AP does not respond and no candidate AP is valid (none responded to directed probe requests), the client 118 will transition to State 7 and start a timer in that state.

In one embodiment of State 3, there are two timers. The first timer is an interrupt driven NDIS timer and the second timer is a polled hardware timer. The probe request timeout uses the interrupt driven NDIS timer provided by the OS (e.g., Windows CE). This timer has a typical limited accuracy of −0/+6 msecs. Thus a 3 msec probe request timeout may take 3 to 10 msecs. The dwell time per access point is driven by polling an NDIS hardware timer provided by the OS. The dwell time limits the maximum number of probe requests that will be sent by the client 118. A typical probe request/probe response transaction takes about 0.5 to 1 msec under no load conditions. The hardware timer is accurate to within hundredths of microsecs. To ensure that a minimum number of probe requests are tried per AP, a mechanism is provided to make sure a minimum number of probe requests are attempted per AP.

Given an RF redundancy factor of three to six, there are three to six access points on the list with a very high SNR that will most likely cover the same area as the current associated access point and are not likely roaming candidates. Inclusion of more than one AP to cover a given area is provided for failure scenarios and to satisfy peak capacity requirements. The goal is for a roaming candidate to be on the list almost all of the time under all conditions. Given a channel switching time of 4 msecs and a Directed Probe Request/Probe Response transaction time of 2 msecs under no load conditions, the SNR of an access point can be characterized in 10 msecs or less with 3 probe requests. Given a maximum off channel time of 100 msecs, 6 access points can be typically characterized in 100 msecs. At the end of 100 msecs or completion of scanning, the entire roaming list the client 118 will enter the association state and attempt to associate with a new access point.

To be considered for handoff, a candidate AP must have an SNR average above the current AP's SNR average by a specified roaming margin (e.g., 6 dB), as noted.

Thus, in State 3 (or alternatively in State 4), a new association list is generated when one or more roaming candidate APs meet the criteria. When the client 118 has scanned the entire roaming candidate list 'n' consecutive times with no candidate APs having an SNR meeting the requirement (i.e., no candidate SNRs equal to or greater than the current AP SNR plus the roaming SNR margin), the client transitions to a Backoff State 414 (State 6). The number 'n' may be any desired number, and in one specific embodiment, "n" equals three.

In State 6, the client 118 continues to monitor the current AP SNR by running the sampled SNR of beacons through the SNR filter. If the SNR filter output rises above the threshold plus the margin value, the client will return to the Current AP Monitor State 406 (State 1). If the client 118 misses 'm' number of beacons, the association is lost and the client 118 will transition to the Connection Lost State 408 (State 7). The value used for "m" may be any appropriate number, and in one embodiment, equals three.

When State 6 is entered, a backoff timer is started. The backoff timer is set with a value of 500 msec plus a random number of additional milliseconds between 0-500. If the client 118 has not lost media connection and has not transitioned back to the Current Monitor State 1 when the backoff timer expires, the client 118 transitions to the Candidate Search State 410 (State 3) and re-scans the candidate list in accordance therewith.

As described, in State 3 (or State 4), a new association list is generated when one or more roaming candidate APs meet the criteria. Once this list is generated, the process 400 transitions to the Fast Handoff State 412 (State 4).

In State 4, the client 118 attempts to roam to a new AP based on the SNR and load factor obtained in State 3 from the probe responses and the switch ID obtained in State 1 from the roaming candidate list. In one embodiment, the selection process for the new AP operates by first ranking the association candidate APs by SNR. The SNR ranking is from highest to lowest SNR. All roaming candidates that have an SNR equal to or better than the current AP's SNR plus the specified margin (e.g., current AP SNR plus 6 dB) are identified in the new association list. The new list of potential handoff APs is then processed and categorized as follows:

Group 1—APs with a load factor<AP load threshhold and a switch ID equal to that of the current AP;

Group 2—APs with a load factor<AP load threshold, a switch ID and resiliency ID equal to that of the current AP;

Group 3—APs with a load factor<AP load threshold and a switch and resiliency ID does NOT equal to that of the current AP;

Group 4—APs with a load factor>AP load threshold and a switch ID equal to that of the current AP;

Group 5—APs with a load factor<AP load threshold, a switch ID and resiliency ID equal to that of the current AP; and Group 6—APs with a load factor>AP load threshold and a switch and resiliency ID NOT equal to that of the current AP.

Within each group, the APs are ranked by SNR. The client 118 attempts to associate with an AP starting with group 1 and moving to group 6. Other suitable selection processes may be utilized.

The AP load threshold is a utilization factor that indicates what percentage of the AP's capacity in terms of associated clients is being utilized. For example, given an AP's maximum capacity equal to 12 clients, the AP will advertise 50% utilization when there are 6 clients associated. Other types of load information may be used to determine the AP load threshold.

If the handoff to the new AP fails, the client 118 moves to next best AP in the list, per the desired selection process or criteria, and attempts to handoff. If the candidates in the association list are exhausted with no successful handoff, the client 118 maintains association to the current AP (or reassociates to the current AP) and returns to State 3 to re-scan the candidate APs in the roaming candidate list. This may be done one or more times. Optionally, the client may transition back to State 1.

In an alternative embodiment, the handoff selection process eliminates all APs from the association list with load utilization greater than or equal to 110% allowing the system to accept and report overloading situations. Next, of the top two SNR-ranked APS, an AP is chosen whose Switch ID is equal to the current AP Switch ID. If neither have the same Switch ID as the current Switch ID, the highest SNR ranked AP is chosen. As will be appreciated, other selection or ranking processes may be utilized to determine to which candidate APs the client device 118 will attempt handoff.

As will be appreciated, the states illustrated and identified herein are major states. These states may have one or more sub-states associated therewith if actions are performed transitions to other actions or states occur. Thus, some states may not be explicitly described as a "state" but function as such.

The process 400 may optionally include one or more additional states, such as Supplicant Exchange States 416, 418 (States 8, 9), to integrate Wireless Accelerated Roaming Protocol (WARP) functionality into the process 400. This functionality and its benefits and implementation are known to those skilled in the art, and no further description thereof is provided herein.

The process 400 may optionally include a Mobility State (State 2) (not shown). If utilized, State 2 would be entered from State 1 when the change in SNR with respect to time exceeds a threshold indicating that the client device is moving or the environment around the client device is varying significantly. In State 2, the client scans and monitors for changes in SNR with respect to time for its roaming candidates in preparation for a handoff.

As will be appreciated, additional processes or functionality that may be necessary or corresponding to the process 400 are included within the WLAN 100 infrastructure (e.g., the access points 108, security switches 106, etc.) as needed. Further description of these processes/functionality is not necessary to allow a person of ordinary skill in the art to implement the components and WLAN 100 of the present invention. However, some additional description of certain aspects of these processes/functionality may be provided herein.

Various packets or frames (e.g., beacons, probe requests, probe responses, association and re-association requests, association and re-association responses, disassociation requests or response, and perhaps others) that are transmitted/received by the various devices in the WLAN 100 will include additional information. The relevant information may be added to packets/frames within a vendor-specific informational element (as set forth in the 802.11 standard).

These frames/packets may include any or all of the following information: pico cell network identification, WLAN capabilities, AP details, roaming candidate AP list, mobility domain, addressing, switch ID, list of APs, client device (station) details, etc.

In one embodiment, the association and reassociation responses include the roaming candidate list with a switch ID per candidate. This list and associated information may be generated by the switch 106 or AP 108 to indicate to the client 118 which other APs will accept an association or reassociation request from the client 118. This list may also include the list of APs information (described further below) and AP load information (described further below) for each listed candidate roaming AP. Further included may be time since last reception, signal strength and quality, and other operating parameters information for each listed roaming candidate AP. In another embodiment, the AP load information may be obtained from probe responses (see below). Switch ID information may be used to minimize switch handoffs (i.e., desirable to handoff to an AP that is configured to the same switch 106 as the current associated AP).

In one embodiment, probe responses include load information about the probed AP. Load information may include percent of maximum number of allowed associate client, bandwidth utilized, or processing load, etc. Other load information may be provided. Beacons include information or an identifier that indicates the AP is part of a pico cell network, which may be used by the client 118 to invoke the process 400 (or its applicable portion) described herein.

The WLAN capabilities information are typically generated by the switches 106 (and/or APs 108), and used to indicate features and functions of the WLAN that a client device 118 may utilize. This may include identifying capabilities/modes such as (1) pico cell network (fast roaming capability or mode), (2) proxy ARP (switch/AP capable of providing proxy ARP service for associated client devices, (3) dynamic QOS (switch/AP capable of providing dynamic QOS), (4) cooperative handoff (switch/AP capable of providing cooperative handoff services), and (5) single authentication (switch/AP provides single authentication services as the client device roams in the same mobility group). In one embodiment, this information is provided in beacons and probe responses.

The AP details information is used to announce information about an AP and its associated switch. This information may include AP load information and addressing and mobility group information. A client device 118 may use this information during roaming/handoff and during other processes. Generally, all switches 106 and/or APs in the network 100 will provide their mobility group IDs (MGID) and controller address (i.e., IP address) in the AP details information which is included in beacons, probe responses and association responses. Further, association, reassociation and disassociation requests may include AP details information which the client device received in a previous successful association (from an association response).

The client device (station) details information is used to announce information about a client device. This information may include a handoff counter (number of handoffs) and addressing and mobility group information. This information may be used during roaming/handoff.

The list of APs information is used by the client 118 to identify APs to which the client can communicate and the quality of the communication, and may include channel number and AP address, physical types (e.g., 802.11a, 802.11b, 802.11g), signal strength (dBm), signal quality (SNR, dB).

The following will now describe, in general terms, the process where a client device 118 enters the network 100, associates with an AP 108, preemptively roams, and hands-off to another AP 108.

The client device 118 receives one or more beacons from one or more of the APs 108. The beacon(s) includes information identifying the network 100 as a pico cell network or network capable of compatibility with a fast roaming and preemptive handoff algorithm (400). In response, the client device 118 switches from a standard roaming and handoff process to the fast roaming process (or simply initiates the fast roaming process).

The client device scans all active channels seeking an available access point 108 by broadcasting probe requests and receiving probe responses from the APs 108. From the responses, the client device 118 measures SNRs for the channels/APs and selects an appropriate AP (and channel) for association (i.e., connection). An association process occurs, which includes transmission of an association request from the client device 118 to the selected AP 108 and receipt of an association response. At or during association, the AP 108 transmits the roaming candidate list to the client device 118. This list (and information therein) is generated by the switches 106 from information gathered by the APs 108 in the network (and perhaps other devices). It may optionally include AP loading and switch ID information.

Once associated, the client device 118 continuously monitors and measures received RF signals (beacons and/or overheard packets or packets intended for the client device within the channel) transmitted from the associated AP 108. If the current AP SNR falls below a threshold having a value that is equal to the SNR requirement to support the minimum supported data rate plus a configurable margin, then the client device 118 will initiate a preemptive roaming process and seek a different AP for association.

While maintaining the association with the current AP 108, the client device 118 transmits directed probes to all APs 108 in the candidate roaming list and receives probe responses that include AP load information. From the responses, the client device 118 also measures the SNR for each candidate AP. From the measured SNR (and/or switch ID and AP load information), a new association list is generated that identifies potential APs for handoff. The candidate roaming APS are placed on the list when their SNR values equal or exceed a threshold value (and/or meet other desired criteria). This threshold value is the SNR value of the current associated AP plus some configurable margin. The APs in the new association list are ranked according to a predetermined process. Other factors (AP load, switch ID) that may assist in ranking or dropping a candidate from the list. If no APs meet the required criteria to be on the new association list, these steps may be repeated. If repeats occur with no success, a timed backoff state is entered while the current AP SNR is still monitored. When the backoff time elapses, the client device 118 returns retries these steps again.

The client device 118 then attempts to hand-off or associate to one of the APs 108 in the new association list in accordance with the rankings. If unsuccessful, a new attempt is made to another AP 108.

If a number of beacons are missed while in a current associated state, the mobile device 118 transmits a reassociation request in an attempt to re-associate to the current AP 108. If unsuccessful, the mobile device 118 actively scans all APs/channel, as described above, to associate to an AP 108/

WARP actions may optionally be included in this process at desired points. Further, SNRs may be measured during an association to determine the rate of change, this may be used to initiate the preemptive roaming steps.

In some embodiments, certain functions and methods performed by the mobile devices 118, access points 108, and/or switches 106 (and other devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. In this document, the term "couple," "connect" and their derivatives refer to any direct or indirect communication between two or more elements, whether or not those elements are in physical contact with one another.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of hand-off for a mobile terminal from a first access point to a second access point in a wireless local area network (WLAN), the method comprising:
   measuring in a mobile terminal signal to noise ratio (SNR) of first RF signals received directly from the first access point;
   if the measured SNR of the first RF signals is below a first threshold, measuring SNR of RF signals received directly from a plurality of candidate access points in a roaming candidate list stored on the mobile terminal;
   generating a new association list based on said measuring the SNR of RF signals received directly from the plurality of candidate access points, wherein the new association list comprises candidate access points of the roaming candidate list having a measured SNR exceeding a second threshold and does not comprise access points having a measured SNR below the second threshold, wherein the second threshold is higher than the first threshold, and wherein the second threshold is equal to the SNR of the first RF signals in addition to a margin;
   selecting one of the candidate access points in the new association list, wherein said selecting is performed based on SNR and load of candidate access points in the new association list, wherein said selecting comprises ranking the plurality of candidate access points based on a comparison of a load of each candidate access point to a first access point load threshold, wherein said ranking comprises grouping the plurality of candidate access points in a plurality of groups based on a switch identification (ID) and a resiliency ID; and
   attempting to associate the mobile terminal to the selected candidate access point.

2. The method of claim 1, further comprising:
   associating the mobile terminal to the first access point in the WLAN; and
   receiving from the first access point the roaming candidate list identifying the plurality of candidate access points in the WLAN.

3. The method of claim 1, wherein said selecting comprises comparing a current load of each candidate access point to a load threshold.

4. The method of claim 1, wherein the first RF signals are beacons.

5. The method of claim 1, wherein the plurality of groups comprises:
   a first group comprising candidate access points with a load less than the first access point load threshold and a switch ID equal to a switch ID of the first access point;
   a second group comprising candidate access points with a load less than the first access point load threshold, a switch ID equal to the switch ID of the first access point, and a resiliency ID equal to a resiliency ID of the first access point; and
   a third group comprising candidate access points with a load less than the first access point load threshold, a switch ID not equal to the switch ID of the first access point, and a resiliency ID not equal to a resiliency ID of the first access point; and
   wherein, within each group, candidate access points are ranked by SNR, and wherein the first group is preferred over the second group and the second group is preferred over the third group.

6. The method of claim 1, wherein the first threshold is an average SNR of the first access point.

7. A mobile terminal operable for wireless connection to one or more access points in a wireless local area network (WLAN), the device comprising:
   means for measuring signal to noise ratio (SNR) of first RF signals received directly from a first access point;
   if the measured SNR of the first RF signals is below a first threshold, means for measuring SNR of RF signals received directly from each of a plurality of candidate access points in a roaming candidate list;
   means for generating a new association list based on said measuring the SNR of RF signals received directly from the plurality of candidate access points, wherein the new association list comprises candidate access points of the roaming candidate list having a measured SNR exceeding a second threshold and does not comprise access points having a measured SNR below the second threshold, wherein the second threshold is higher than the first threshold, and wherein the second threshold is equal to the SNR of the first RF signals in addition to a margin;
   means for selecting one of the candidate access points in the new association list, wherein said selecting is performed based on SNR and load of candidate access points in the new association list, wherein said means for selecting comprises ranking the plurality of candidate access points based on a comparison of a load of each candidate access point to a first access point load threshold, wherein said ranking comprises grouping the plurality of candidate access points in a plurality of groups based on a switch identification (ID) and a resiliency ID; and means for attempting to associate the mobile device to the selected candidate access point.

8. The mobile terminal of claim 7, further comprising:
means for associating the mobile terminal to a first access point in the WLAN; and
means for receiving from the first access point the roaming candidate list identifying the plurality of candidate access points in the WLAN.

9. The mobile terminal of claim 7, wherein said selecting comprises comparing a current load of each candidate access point to a load threshold.

10. The mobile terminal of claim 7, wherein the plurality of groups comprises:
a first group comprising candidate access points with a load less than the first access point load threshold and a switch ID equal to a switch ID of the first access point;
a second group comprising candidate access points with a load less than the first access point load threshold, a switch ID equal to the switch ID of the first access point, and a resiliency ID equal to a resiliency ID of the first access point; and
a third group comprising candidate access points with a load less than the first access point load threshold, a switch ID not equal to the switch ID of the first access point, and a resiliency ID not equal to a resiliency ID of the first access point; and
wherein, within each group, candidate access points are ranked by SNR, and wherein the first group is preferred over the second group and the second group is preferred over the third group.

11. The mobile terminal of claim 7, wherein the first RF signals are beacons.

12. A state machine for use by a mobile terminal in a wireless area network, the state machine comprising:
a first state in which the mobile terminal is associated with a first access point in the network and signal to noise ratio (SNR) of first RF signals received directly from the first access point are measured;
a second state in which SNR of RF signals received directly from a plurality of candidate access points in a roaming candidate list are measured and a new association list is generated based on measuring the SNR of RF signals received directly from the plurality of candidate access points, wherein the new association list comprises candidate access points of the roaming candidate list having a measured SNR exceeding a second threshold and does not comprise access points having a measured SNR below the second threshold, wherein the second threshold is higher than the first threshold, wherein the second threshold is equal to the SNR of the first RF signals in addition to a margin, the state machine transitioning from the first state to the second if the measured SNR of the first RF signals is below a first threshold;
a third state in which one of the candidate access points in the new association list is selected based on SNR and load of candidate access points in the new association list, wherein selection comprises ranking the plurality of candidate access points based on a comparison of a load of each candidate access point to a first access point load threshold, wherein said ranking comprises grouping the plurality of candidate access points in a plurality of groups based on a switch identification (ID) and a resiliency ID and an attempt is made to associate the mobile terminal to the selected candidate access point, the state machine transitioning from the second state to the third state if there is at least one candidate access point in the new association list.

13. The state machine of claim 12, further comprising:
a fourth state in which a plurality of channels associated with a plurality of access points are scanned to determine SNRs for each of the plurality of access points, one of the plurality of access points is selected and the mobile terminal attempts to associate to the selected access point, the state machine transitioning from the fourth state to the first state when the mobile terminal associates with the selected access point.

14. The method of claim 12, wherein selecting the candidate access point from the new association list comprises comparing a current load of each candidate access point to a load threshold.

15. A mobile terminal for communicating with one or more access points in a wireless local area network (WLAN), the device comprising:
a processor;
a transceiver coupled to the processor;
an antenna coupled to the transceiver for receiving and transmitting RF signals from and to the one or more access points in the WLAN; and
wherein the processor is configured to:
measure signal to noise ratio (SNR) of first RF signals received directly from the first access point;
if the measured SNR of the first RF signals is below a first threshold, measure SNR of RF signals received directly from each of a plurality of candidate access points in a roaming candidate list stored in the mobile terminal;
generate a new association list based on said measuring the SNR of RF signals received directly from the plurality of candidate access points, wherein the new association list comprises candidate access points of the roaming candidate list having a measured SNR exceeding a second threshold and does not comprise access points having a measured SNR below the second threshold, wherein the second threshold is higher than the first threshold, and wherein the second threshold is equal to the SNR of the first RF signals in addition to a margin;
select one of the candidate access points in the new association list, wherein said selecting is performed based on SNR and load of candidate access points in the new association list, wherein to select one of the candidate access points the processor is further configured to rank the plurality of candidate access points based on a comparison of a load of each candidate access point to a first access point load threshold, wherein to rank the plurality of candidate access points, the processor is further configured to group the plurality of candidate access points in a plurality of groups based on a switch identification (ID) and a resiliency ID; and
attempt to associate the mobile device to the selected candidate access point.

16. The mobile terminal of claim 15, wherein the processor is further configured to:
  associate the mobile terminal to a first access point in the WLAN; and
  receive from the first access point the roaming candidate list identifying the plurality of candidate access points in the WLAN.

17. The mobile terminal of claim 15, wherein to select one of the candidate access points, the processor is further configured to compare a current load of each candidate access point to a load threshold.

18. The mobile terminal of claim 15, wherein the first RF signals are beacons.

19. The mobile terminal of claim 15, wherein the plurality of groups comprises:
  a first group comprising candidate access points with a load less than the first access point load threshold and a switch ID equal to a switch ID of the first access point;
  a second group comprising candidate access points with a load less than the first access point load threshold, a switch ID equal to the switch ID of the first access point, and a resiliency ID equal to a resiliency ID of the first access point; and
  a third group comprising candidate access points with a load less than the first access point load threshold, a switch ID not equal to the switch ID of the first access point, and a resiliency ID not equal to a resiliency ID of the first access point; and
  wherein, within each group, candidate access points are ranked by SNR, and wherein the first group is preferred over the second group and the second group is preferred over the third group.

20. The mobile terminal of claim 15, wherein the first threshold is an average SNR of the first access point.

* * * * *